(12) United States Patent
Sudou et al.

(10) Patent No.: US 9,285,881 B2
(45) Date of Patent: Mar. 15, 2016

(54) TACTILE SENSATION PROVIDING DEVICE

(75) Inventors: Tomohiro Sudou, Yokohama (JP); Hiroshi Tsuruta, Yokohama (JP); Atsuo Chiba, Yokohama (JP); Motoaki Abe, Yokohama (JP); Nayu Nomachi, Yokohama (JP); Hisae Honma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 155 days.

(21) Appl. No.: 13/982,244

(22) PCT Filed: Jan. 27, 2012

(86) PCT No.: PCT/JP2012/000530
§ 371 (c)(1),
(2), (4) Date: Jul. 26, 2013

(87) PCT Pub. No.: WO2012/102054
PCT Pub. Date: Aug. 2, 2012

(65) Prior Publication Data
US 2013/0314357 A1    Nov. 28, 2013

(30) Foreign Application Priority Data

Jan. 27, 2011  (JP) ................................. 2011-015708

(51) Int. Cl.
*G06F 3/01*    (2006.01)
*G06F 3/0488*    (2013.01)

(52) U.S. Cl.
CPC .............. *G06F 3/016* (2013.01); *G06F 3/0488* (2013.01); *G06F 2203/014* (2013.01)

(58) Field of Classification Search
CPC ......... H04W 4/24; H04W 4/008; H04W 4/02; H04W 4/026; H04W 4/027; H04W 76/02; H04W 64/00; H04W 12/08; H04W 36/24; H04W 48/04; H04W 4/20; G06F 3/0488; G06F 3/016; G06F 2203/04108; G06F 2203/04809; G06F 3/0312; G06F 3/03545; G06F 3/0425; G06F 2203/014; G06F 2203/04808; G06F 3/0421; G06F 3/044; G06F 3/04886

See application file for complete search history.

(56) References Cited

U.S. PATENT DOCUMENTS

| | | | |
|---|---|---|---|
| 2007/0146343 A1* | 6/2007 | Prados | 345/173 |
| 2010/0161207 A1* | 6/2010 | Do | 701/200 |
| 2011/0163978 A1* | 7/2011 | Park et al. | 345/173 |

FOREIGN PATENT DOCUMENTS

| | | |
|---|---|---|
| JP | 2000-205878 A | 7/2000 |
| JP | 2004-309962 A | 11/2004 |
| JP | 2007-205889 A | 8/2007 |

OTHER PUBLICATIONS

International Search Report; PCT/JP2012/000530; May 1, 2012.
An Office Action; "Notice of Reason for Rejection," issued by the Japanese Patent office on Feb. 4, 2014, which corresponds to Japanese Patent Application No. 2012-554700 and is related to U.S. Appl. No. 13/982,244; with English language concise explanation.

\* cited by examiner

*Primary Examiner* — Gerald Johnson
(74) *Attorney, Agent, or Firm* — Studebaker & Brackett PC (57) ABSTRACT

The tactile sensation providing device according to the present invention includes a touch sensor (120) that detects contact, a tactile sensation providing unit (130) that provides a tactile sensation to a contacting object in contact with the touch sensor (120), and a control unit (110) that controls the tactile sensation providing unit (130), when the touch sensor (120) detects a slide operation by the contacting object, to provide the tactile sensation continuously while varying the tactile sensation provided to the contacting object during the slide operation in accordance with a position of the contacting object during the slide operation, whereby can provide the user's finger, when detecting a slide operation by a user, with a tactile sensation that varies during the slide operation in accordance with the position of the user's finger during the slide operation.

2 Claims, 6 Drawing Sheets

Tactile sensation corresponding to elevation

Distance of slide operation

Tactile sensation corresponding to elevation

Distance of slide operation

Tactile sensation corresponding to elevation

Distance of slide operation

Tactile sensation corresponding to elevation

Distance of slide operation

TACTILE SENSATION PROVIDING DEVICE

CROSS-REFERENCE TO RELATED APPLICATION

This application claims priority to and the benefit of Japanese Patent Application No. 2011-15708 filed Jan. 27, 2011, the entire contents of which are incorporated herein by reference.

TECHNICAL FIELD

The present invention relates to a device which detects an operation to slide a finger on a touch panel.

BACKGROUND

In recent years, a variety of user interfaces incorporating a touch panel have been provided. A combination of a touch sensor, which detects an input operation by a user, and a display device, such as a liquid crystal panel, is normally used in a touch panel.

When the user contacts or applies pressure to an icon or other such object displayed on the touch panel, using a finger or a pen referred to as a stylus, the touch panel outputs position information, which corresponds to the position on the screen of the display device, as an electrical signal. A touch panel type mobile terminal or the like executes a predetermined operation, such as launching an application, in response to the received information regarding the position on the screen.

In this way, by using an interface that uses a touch panel, the user can intuitively perform operations.

Among interfaces that use a touch panel, some interfaces detect an operation to trace a finger along the touch panel (referred to hereinafter as a slide operation). For example, Patent Literature 1 relates to a navigation device and allows for correction of map data when a slide operation from an original route towards a corrected route is executed on a road map displayed on the screen.

CITATION LIST

Patent Literature 1: JP2007205889A

SUMMARY

According to the invention disclosed in Patent Literature 1, a touch panel detects a slide operation, and in accordance with the position of the detected slide operation, the navigation device can execute data correction of map data and the like.

There is demand, however, for an even more intuitive user interface using a touch panel, and also for a more intuitive user interface regarding a slide operation.

The present invention has been conceived in light of these considerations, and is to provide a tactile sensation providing device that, when detecting a slide operation by a user, can provide the user's finger with a tactile sensation that varies during the slide operation in accordance with the position of the user's finger during the slide operation.

In order to achieve the above object, a tactile sensation providing device according to the present invention includes: a touch sensor configured to detect contact; a tactile sensation providing unit configured to provide a tactile sensation to a contacting object in contact with the touch sensor; and a control unit configured to control the tactile sensation providing unit, when the touch sensor detects a slide operation by the contacting object, to provide the tactile sensation continuously while varying the tactile sensation provided to the contacting object during the slide operation in accordance with a position of the contacting object during the slide operation.

The tactile sensation providing device preferably further includes: a display unit overlaid on the touch sensor and configured to display a map; and a memory unit configured to store map data including characteristic information for each location on the map, such that the control unit controls the tactile sensation providing unit, when the touch sensor detects a slide operation by the contacting object, to vary the tactile sensation provided to the contacting object during the slide operation in accordance with the characteristic information for the location on the map corresponding to the position of the contacting object during the slide operation.

The characteristic information is preferably elevation information.

The control unit preferably searches for a route from a point of departure to a destination and controls the display unit to display the route on the map being displayed, and when the touch sensor detects an operation to search again by the contacting object in a predetermined region including a position on the route, the control unit preferably searches again for another route including a region with a smaller elevation difference than an elevation difference in the predetermined region.

While aspects of the present invention have been described above in terms of devices, the present invention may also be achieved by a method or a program substantially equivalent to the above devices, or by a storage medium having such a program recorded thereon. These aspects are also to be understood as included in the scope of the present invention.

According to the present invention, when a slide operation by a user is detected, the user's finger can be provided with a tactile sensation that varies during the slide operation in accordance with the position of the user's finger during the slide operation.

BRIEF DESCRIPTION OF DRAWINGS

The present invention will be further described below with reference to the accompanying drawings, wherein.

DESCRIPTION OF EMBODIMENTS

The embodiments discussed herein relate to a device which receives for providing a tactile sensation in accordance with contact, and in particular to a device for providing a tactile sensation that varies in accordance with position during an operation to slide a finger on a touch panel.

The following describes embodiments of a tactile sensation providing device according to the present invention in detail with reference to the drawings.

Figure 1:
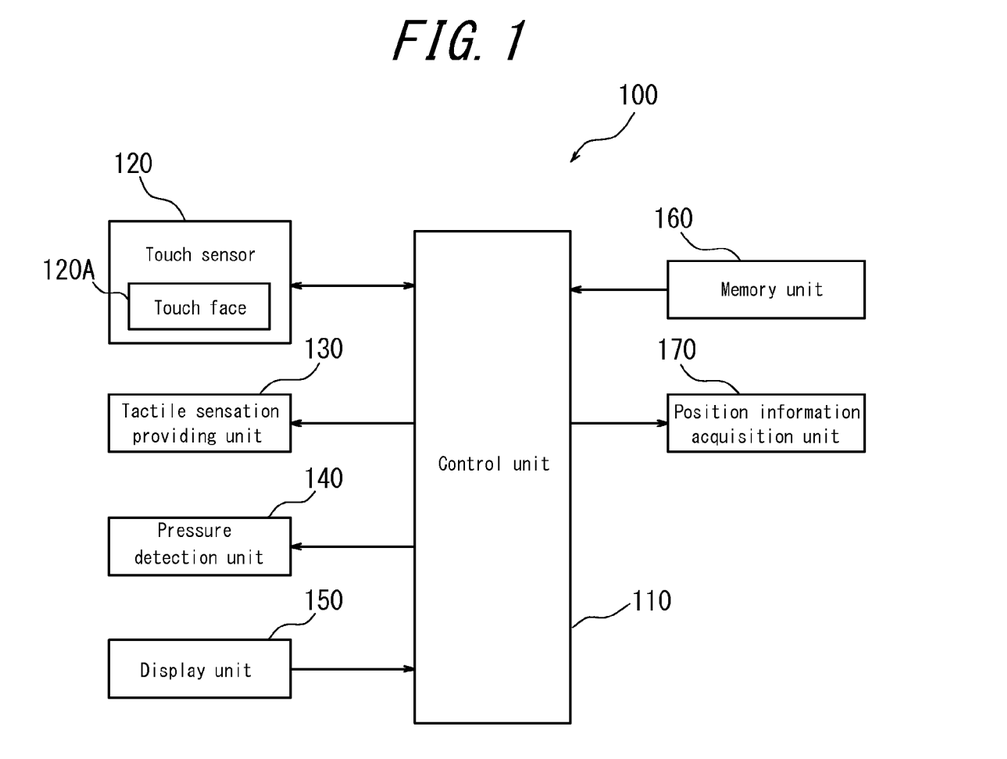
FIG. 1 is a functional block diagram schematically illustrating the configuration of a tactile sensation providing device according to an embodiment of the present invention.

FIG. 1 is a functional block diagram schematically illustrating the configuration of a tactile sensation providing device 100. The tactile sensation providing device 100 is provided with a control unit 110, a touch sensor 120, a tactile sensation providing unit 130, a pressure detection unit 140, a display unit 150, a memory unit 160, and a position information acquisition unit 170.

The control unit 110 controls and manages the entire tactile sensation providing device 100, starting with the functional units thereof, and is configured using a suitable processor, such as a CPU or the like.

The touch sensor 120 detects contact by a finger, stylus pen, or the like on a touch face 120A thereof and is configured using a well-known resistive film type, capacitive type, optical type, or other type of transparent touch sensor that outputs two-dimensional position information on a touch position. The touch sensor 120 is provided on the front face of the display unit 150. The position information from this touch sensor 120 is provided to the control unit 110. The object contacting the touch face 120A, such as the user's finger, a stylus, or the like, is hereinafter referred to as a "contacting object". The user's finger is described below as an example of the contacting object, but this is merely an example; the contacting object is not limited to the user's finger. Note that in order for the touch sensor 120 to detect input, it is not essential for the user's finger or the like to physically press the touch sensor 120. For example, if the touch sensor 120 is an optical type, the touch sensor 120 detects the position at which an infrared ray is blocked by a finger or the like and can therefore detect input even in the absence of a physical press.

The tactile sensation providing unit 130 transmits a vibration to the touch face 120A of the touch sensor 120 and is, for example, configured using a piezoelectric element, an ultrasonic transducer, or the like. By vibrating, the tactile sensation providing unit 130 can provide a tactile sensation to a user's finger or the like pressing on the touch sensor 120. Furthermore, the tactile sensation providing unit 130 can be configured to vibrate the touch face 120A of the touch sensor 120 indirectly via a vibration motor (eccentric motor).

Upon the control unit 110 changing the driving voltage applied to a piezoelectric element, the tactile sensation providing unit 130 provides a different tactile sensation to the user's finger. The control unit 110 can change the frequency, amplitude, waveform, or the like of the driving voltage. The magnitude of the frequency and the amplitude can be changed, and the waveform can be made a sine wave, a rectangular wave, a triangular wave, or the like.

The pressure detection unit 140 detects pressure on the touch face 120A of the touch sensor 120 and is, for example, configured using a strain gauge sensor, a piezoelectric element, or the like that experiences a change in physical or electrical characteristics (strain, resistance, voltage, or the like) in response to pressure. When the pressure detection unit 140 is configured using a piezoelectric element, for example, the magnitude of the voltage (voltage value), which is an electrical characteristic, of the piezoelectric element changes in accordance with the magnitude of the load (force) of the pressure on the touch face 120A of the touch sensor 120 (or the speed at which the magnitude of the load (force) changes (acceleration)). The pressure detection unit 140 notifies the control unit 110 of the magnitude of the voltage (voltage value, hereinafter referred to simply as data). The control unit 110 acquires the data by the pressure detection unit 140 notifying the control unit 110 of the data, or by the control unit 110 detecting data relating to the piezoelectric element in the pressure detection unit 140. In other words, the control unit 110 acquires data based on the pressure load on the touch face 120A of the touch sensor 120. That is, the control unit 110 acquires data based on pressure from the pressure detection unit 140. Note that, when the tactile sensation providing unit 130 and the pressure detection unit 140 are, for example, both configured using a piezoelectric element, the tactile sensation providing unit 130 and the pressure detection unit 140 can be configured integrally using a shared piezoelectric element. The reason is that a piezoelectric element has the property of generating an electric charge when pressure is applied and of deforming upon application of an electric charge.

The pressure detection unit 140 can be used for the purpose of preventing an erroneous operation. For example, when data based on pressure acquired from the pressure detection unit 140 satisfies a predetermined standard, the control unit 110 processes the contact of the user's finger detected by the touch sensor 120 as an operation, yet when data based on pressure does not satisfy the predetermined standard, the control unit 110 does not process the contact of the user's finger detected by the touch sensor 120 to be an operation. In this way, the control unit 110 can prevent erroneous operation due to contact not intended by the user.

The display unit 150 is configured using, for example, a liquid crystal display (LCD), an organic EL display, or the like. The display unit 150 displays a map, various types of information, and the like. On the front face of the display unit 150, the touch sensor 120 is provided for detecting input to the touch face 120A by the user's finger or the like.

The memory unit 160 stores map data. The map data includes map information, characteristic information on each location on the map, and the like. Characteristic information is, for example, elevation, road width, road pavement conditions, or the like and is associated with each location on the map.

The memory unit 160 stores information such as a tactile sensation pattern provided by the tactile sensation providing unit 130 and also functions as a work memory or the like. The tactile sensation pattern referred to here is specified by factors such as the form of vibration (frequency, phase, vibration interval, number of vibrations, and the like) and the intensity of vibration (amplitude and the like).

The position information acquisition unit 170 acquires the current position of the tactile sensation providing device 100 (position information) and is, for example, configured using a Global Positioning System (GPS) or the like. The position information acquisition unit 170 is also provided with an orientation sensor and can acquire the direction in which a mobile terminal or the like into which the tactile sensation providing device 100 is incorporated is facing (orientation information). The position information acquisition unit 170 provides the acquired position information and orientation information to the control unit 110.

Figure 2:
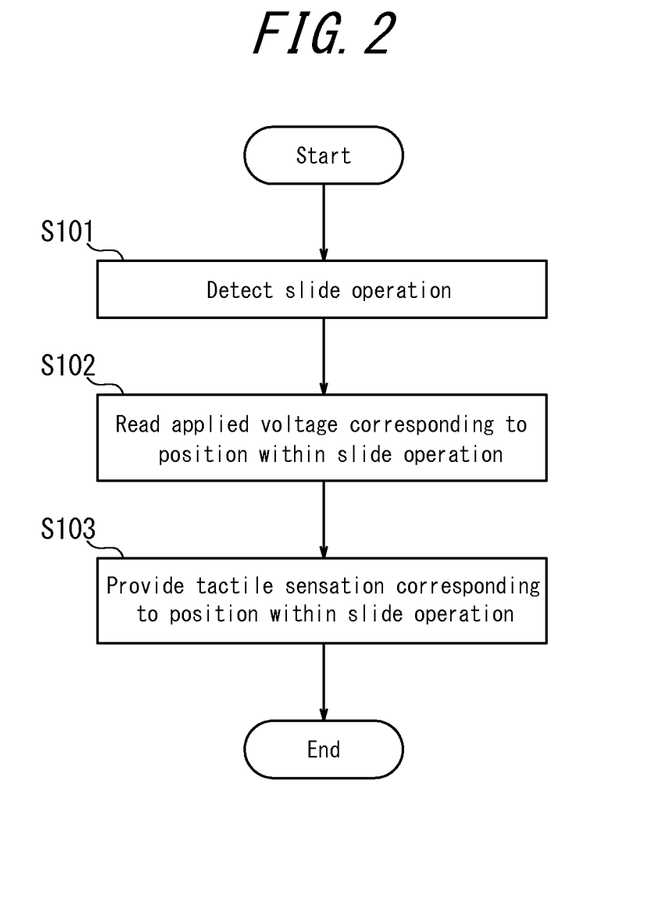
FIG. 2 is a flowchart illustrating operations of the tactile sensation providing device according to an embodiment of the present invention.

With reference to the flowchart in FIG. 2, the following describes the steps by which, when the touch sensor 120 detects a slide operation by the user, the tactile sensation providing unit 130 provides a tactile sensation that varies in accordance with the position of the user's finger during the slide operation.

Upon detecting a slide operation, the touch sensor 120 outputs position information on the user's finger during the slide operation to the control unit 110 (step S101). The position information on the user's finger is output continuously to the control unit 110 in response to movement on the touch sensor 120 of the user's finger from the start to the end of the slide operation. In accordance with the position of the user's finger received continuously from the touch sensor 120 during the slide operation, the control unit 110 reads information from the memory unit 160 on the applied voltage to be applied to the tactile sensation providing unit 130 (step S102). The control unit 110 applies the applied voltage read from the memory unit 160 in step S102 to the tactile sensation providing unit 130. The tactile sensation providing unit 130 provides the user's finger during the slide operation with a tactile sensation in accordance with the position of the slide operation (step S103). When, for example, the display unit 150 is displaying a map, the tactile sensation providing unit 130 provides a tactile sensation in accordance with elevation, road width, road pavement conditions, or the like at the location corresponding to the position of the user's finger on the map.

In this way, while the user is performing a slide operation, the tactile sensation providing device 100 can provide a tactile sensation that varies during the slide operation in accordance with the position on the touch sensor 120 of the user's finger during the slide operation.

Next, with reference to FIGS. 3A through 3F, an example of using the tactile sensation providing device 100 as part of a portable navigation device is illustrated. In this example, the tactile sensation providing unit 130 provides a tactile sensation that varies in accordance with elevation information for the position of the user's finger on the map displayed by the display unit 150.

Figures 3A, 3B:
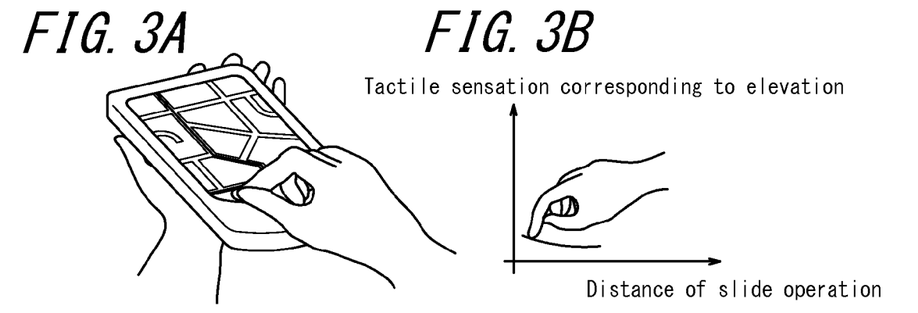
FIGS. 3A-3F illustrate provision of elevation information via a tactile sensation according to another embodiment of the present invention.

FIG. 3A illustrates the start of a slide operation in which the user of a navigation device slides a finger along the touch sensor 120. For more concrete example, the display unit 150 displays a recommended route that the control unit 110 found in accordance with the map and with the point of departure and destination set by the user.

FIG. 3B illustrates the tactile sensation provided by the tactile sensation providing unit 130 during the slide operation. For more concrete example, in the graph in FIG. 3B, the horizontal axis represents the distance the user moves his finger with the slide operation, and the vertical axis represents the tactile sensation that the user receives during the slide operation in correspondence with the elevation of the location on the map.

The vertical axis in FIG. 3B also corresponds to the elevation of the location on the map during the slide operation by the user. In other words, the tactile sensation providing unit 130 provides a tactile sensation that the user perceives as "high elevation", such as a strong vibration, when the elevation of the location on the map corresponding to the position of the user's finger is high and provides a tactile sensation that the user perceives as "low elevation", such as a weak vibration, when the elevation of the location on the map corresponding to the position of the user's finger is low.

That is, FIG. 3B illustrates the tactile sensation that the user receives in accordance with elevation information during the slide operation illustrated in FIG. 3A. The graph in FIG. 3B gently slopes downwards. This indicates that during the slide operation, the user is provided by the tactile sensation providing unit 130 with a tactile sensation perceived as a gradual decrease in elevation. In other words, this indicates that the route on the map traced by the user during the slide operation is a gradual downhill route.

The tactile sensation provided by the tactile sensation providing unit 130 may be associated with the absolute value of the elevation or may be associated with an elevation relative to a standard defined as the elevation of the location where the slide operation starts.

Figures 3C, 3D:
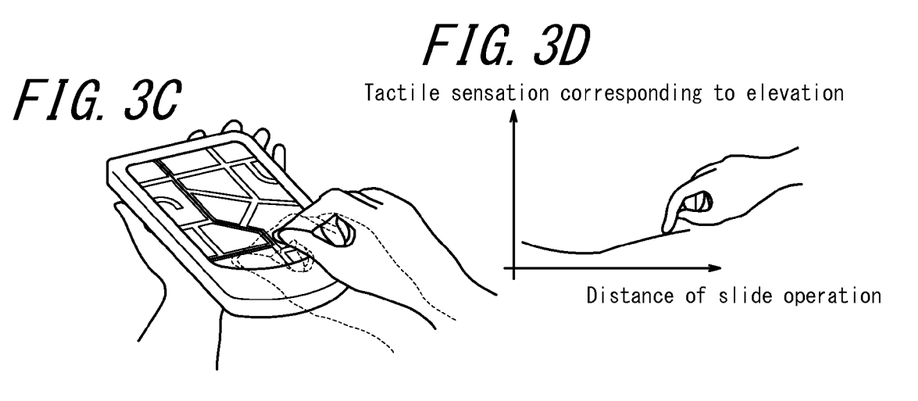

FIG. 3C is a continuation of FIG. 3A, illustrating the user performing a slide operation further towards the right.

FIG. 3D illustrates the tactile sensation that the user receives in accordance with elevation information during the slide operation illustrated in FIG. 3C. The portion of the graph in FIG. 3D continued from FIG. 3B slopes upwards. This indicates that during the slide operation, the user is provided by the tactile sensation providing unit 130 with a tactile sensation perceived as increasing elevation. In other words, this indicates that the route on the map traced by the user during the slide operation is an uphill route.

Figures 3E, 3F:
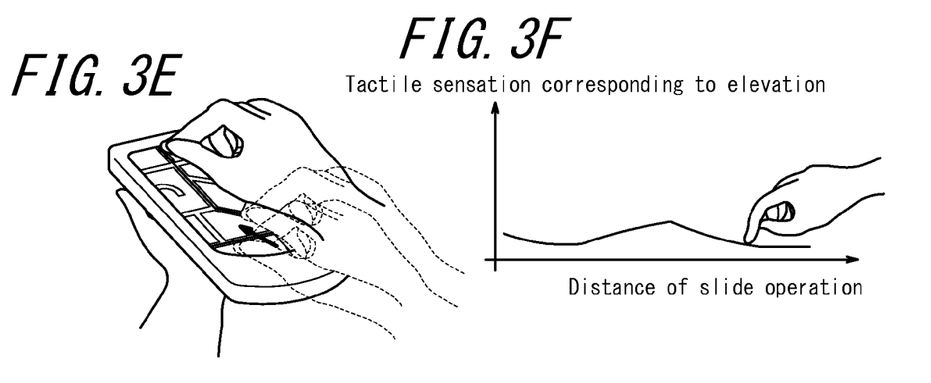

FIG. 3E is a continuation of FIG. 3C, illustrating the user performing a slide operation upwards.

FIG. 3F illustrates the tactile sensation that the user receives in accordance with elevation information during the slide operation illustrated in FIG. 3E. The portion of the graph in FIG. 3F continued from FIG. 3D slopes downwards and then becomes level. This indicates that during the slide operation, the user is provided by the tactile sensation providing unit 130 first with a tactile sensation perceived as decreasing elevation and then with a tactile sensation perceived as no change in elevation. In other words, this indicates that after FIG. 3D, the route on the map traced by the user during the slide operation goes downhill and then becomes even.

In this way, by the tactile sensation providing unit 130 providing the user with elevation information corresponding to a location on the map as a tactile sensation corresponding to elevation, the user can gain an intuitive feel for the elevation of the location on the map displayed by the display unit 150.

Figure 4:
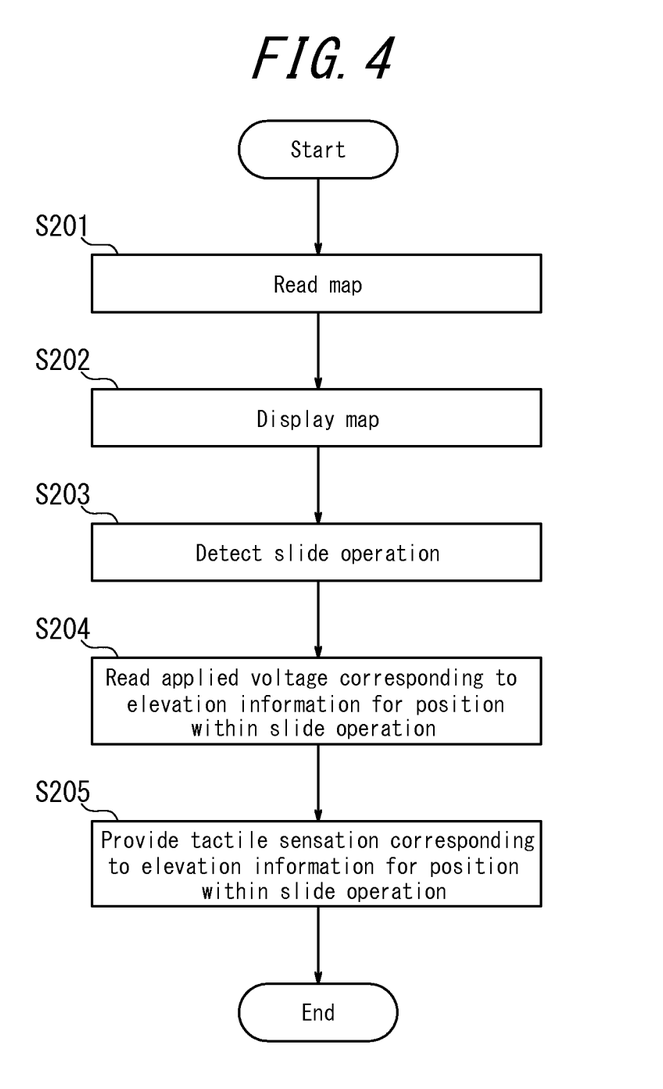
FIG. 4 is a flowchart illustrating operations to provide a tactile sensation in accordance with elevation information by the tactile sensation providing device according to another embodiment of the present invention.

With reference to the flowchart in FIG. 4, the following describes the steps by which, when a slide operation by the user is detected, the user is provided with a tactile sensation that varies in accordance with the position of the user's finger on the map during the slide operation.

The control unit 110 reads the map from the memory unit 160 (step S201). The control unit 110 displays the read map on the display unit 150 (step S202). Upon detecting a slide operation, the touch sensor 120 outputs position information on the user's finger during the slide operation to the control unit 110 (step S203). The position information on the user's finger is output continuously to the control unit 110 in response to movement on the touch sensor 120 of the user's finger from the start to the end of the slide operation. In accordance with the elevation information for the location on the map corresponding to the position of the user's finger received continuously from the touch sensor 120 during the slide operation, the control unit 110 reads information from the memory unit 160 on the applied voltage to be applied to the tactile sensation providing unit 130 (step S204). The control unit 110 applies the applied voltage read from the memory unit 160 in step S204 to the tactile sensation providing unit 130. The tactile sensation providing unit 130 provides the user's finger during the slide operation with a tactile sensation in accordance with the elevation information for the location on the map corresponding to the position of the slide operation (step S205).

With reference to FIGS. 5A-5e and FIG. 6, the following describes searching again for another route when the user of a navigation device is notified, by the tactile sensation providing unit 130, of a steep uphill portion when executing a slide operation with respect to a recommended route.

Figure 5A:
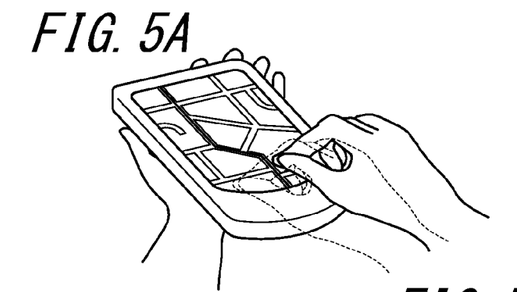
FIGS. 5A-5E illustrate operations, by a tactile sensation providing device according to a modification of the present invention, to search again for a route.

FIG. 5A illustrates operations of a slide operation in which the user of a navigation device slides a finger along a recommended route on the touch sensor 120. In FIG. 5A, the user performs a slide operation on the touch sensor 120 from the left to the right.

Figures 5B, 5C:
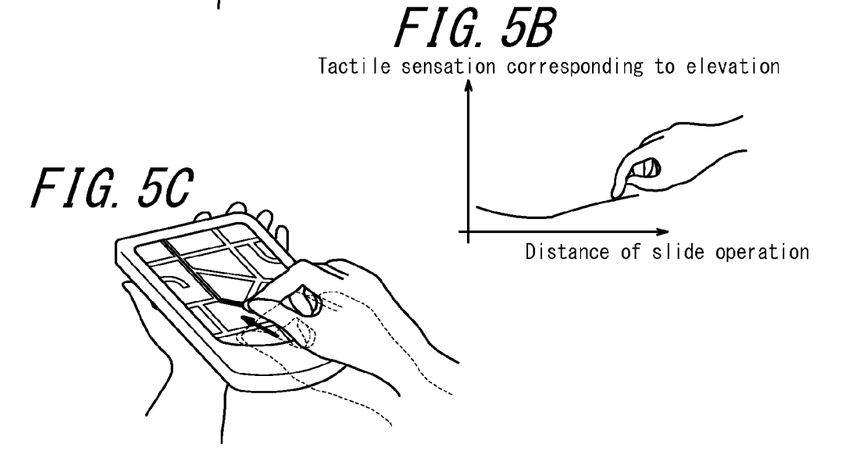

FIG. 5B illustrates the tactile sensation that the user receives during the slide operation to slide over the recommended route illustrated in FIG. 5A. The graph in FIG. 5B briefly remains flat and then slopes upwards. This indicates that in the latter half of the slide operation, the user is provided by the tactile sensation providing unit 130 with a tactile sensation perceived as increasing elevation. In other words, this indicates that the recommended route on the map traced by the user during the latter half of the slide operation is uphill.

FIG. 5C illustrates an operation to search again for another route when the user is provided by the tactile sensation providing unit 130 with a tactile sensation indicating that the recommended route includes an uphill portion, the other route having only an elevation difference smaller than the elevation difference in a predetermined region of the recommended route in which the user's finger is placed (the derivative of the height in the region in which the user's finger is placed). While a variety of operations suitable as the operation that triggers searching again for another route (hereinafter referred to as "operation to search again") are possible, FIG. 5C shows an example of dragging a section of the recommended route and dropping the section on a location separate from the recommended route. In other words, when the user performs an operation to search again in a predetermined region of a recommended route while executing a slide operation on the recommended route, the control unit 110 searches for another route having only an elevation difference smaller than the elevation difference in the predetermined region.

Figure 5D:
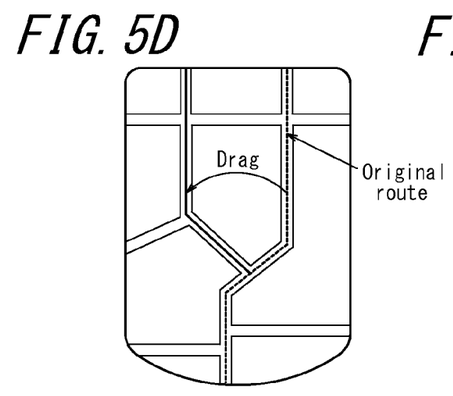

FIG. 5D illustrates the display of the display unit 150 when the operation illustrated in FIG. 5C is executed. In this way, when the touch sensor 120 detects an operation that begins to drag a section of the recommended route and drops the section on a location separate from the recommended route, the control unit 110 can consider the operation as a trigger to search for a route again.

Other than the operation to search again illustrated in FIGS. 5C and 5D, when the touch sensor 120 detects, for example, an operation in which the user moves his finger slightly to the left and right on the recommended route, or an operation to slide over the recommended route backwards, the control unit 110 may consider such an operation as a trigger to search for a route again.

Figure 5E:
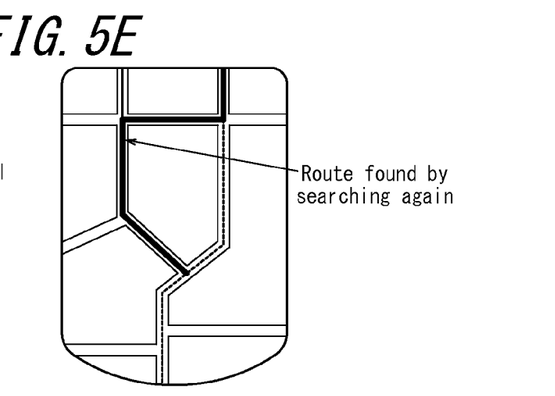

FIG. 5E illustrates how the control unit 110, triggered by the touch sensor 120 detecting the operation to search again illustrated in FIG. 5D, automatically searches again and displays another route found by searching again on the display unit 150.

Figure 6:
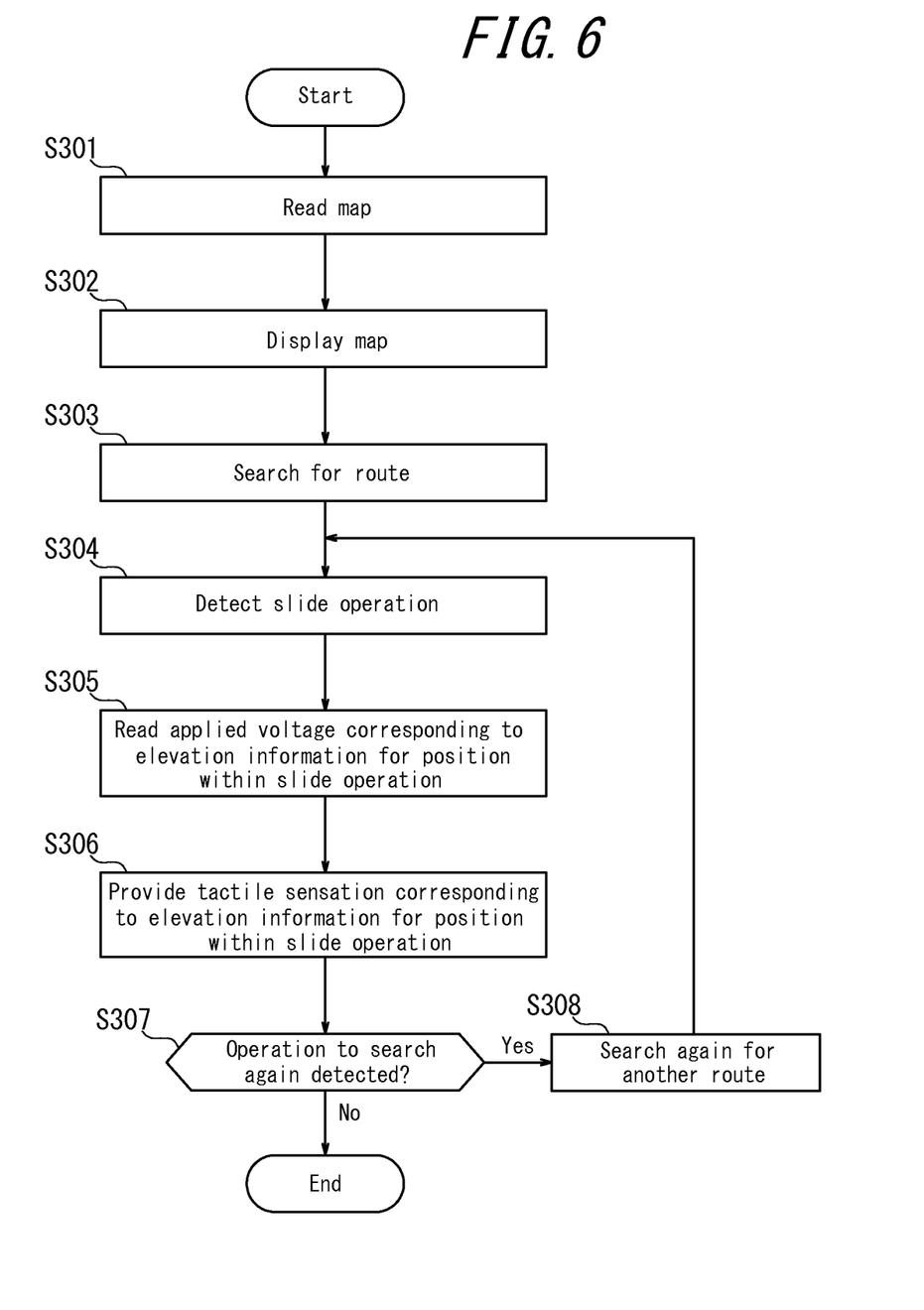
FIG. 6 is a flowchart illustrating operations, by the tactile sensation providing device according to the modification of the present invention, to search again for a route.

With reference to the flowchart in FIG. 6, the following describes the steps by which the user, with respect to a slide operation on the recommended route, is provided with a tactile sensation by the tactile sensation providing unit 130 indicating an uphill portion, and the control unit 110 automatically searches again for another route with only a smaller elevation difference than the recommended route.

The control unit 110 reads the map from the memory unit 160 (step S301). The control unit 110 displays the read map on the display unit 150 (step S302). The control unit 110 then searches for a recommended route based on the point of departure and destination input by the user and displays the recommended route on the display unit 150 (step S303). Upon detecting a slide operation on the recommended route, the touch sensor 120 outputs position information on the user's finger during the slide operation to the control unit 110 (step S304). The position information on the user's finger is output continuously to the control unit 110 in response to movement on the touch sensor 120 of the user's finger from the start to the end of the slide operation. In accordance with the elevation information on the recommended route corresponding to the position of the user's finger received continuously from the touch sensor 120 during the slide operation, the control unit 110 reads information from the memory unit 160 on the applied voltage to be applied to the tactile sensation providing unit 130 (step S305). The control unit 110 applies the applied voltage read from the memory unit 160 in step S305 to the tactile sensation providing unit 130. The tactile sensation providing unit 130 provides the user's finger during the slide operation with a tactile sensation in accordance with the elevation information for the location on the map corresponding to the position of the slide operation (step S306). Upon detecting an operation to search again in a predetermined region on the recommended route, the touch sensor 120 notifies the control unit 110 of the operation (step S307). The control unit 110 automatically searches again for another route having only an elevation difference smaller than the elevation difference in the predetermined region and causes the display unit 150 to display the other route found by searching again (step S308).

In this way, when the recommended route includes an uphill portion, the tactile sensation providing device 100 can provide the user with an intuitive feel for the uphill portion via the tactile sensation provided by the tactile sensation providing unit 130. When the user determines the uphill portion to be steep and performs the operation to search again, the control unit 110 can, in response to the operation to search again, automatically search again for another route having only an elevation difference smaller than the elevation difference in the predetermined region.

Although the present invention has been described by way of embodiments with reference to the accompanying drawings, it is to be noted that various changes and modifications will be apparent to those skilled in the art. Therefore, such changes and modifications are to be understood as included within the scope of the present invention. For example, the functions and the like included in the members, units, steps, and the like may be reordered in any logically consistent way. Furthermore, units, steps, and the like may be combined into one or divided.

The display unit 150 and the touch sensor 120 described in the above embodiments may be configured as an integrated device by, for example, providing a common substrate with the functions of both the display unit 150 and the touch sensor 120. An example of such a device integrating the functions of both the display unit 150 and the touch sensor 120 is a liquid crystal panel having a matrix of pixel electrodes, with a plurality of photoelectric conversion elements, such as photodiodes, regularly mixed therein. This device is contacted by a pen for touch input at a desired position on the panel display, and while displaying images with the liquid crystal panel structure, the device can detect the contact position by light from a backlight for liquid crystal display being reflected by the tip of the pen and received by surrounding photoelectric conversion elements.

REFERENCE SIGNS LIST

100: Tactile sensation providing device
110: Control unit
120: Touch sensor
130: Tactile sensation providing unit
140: Pressure detection unit
150: Display unit
160: Memory unit
170: Position information acquisition unit

The invention claimed is:

1. A tactile sensation providing device comprising:

a touch sensor configured to detect contact;

a tactile sensation providing unit configured to provide a tactile sensation to a contacting object in contact with the touch sensor;

a control unit configured to control the tactile sensation providing unit, when the touch sensor detects a slide operation by the contacting object, to provide the tactile sensation continuously while varying the tactile sensation provided to the contacting object during the slide operation in accordance with a position of the contacting object during the slide operation;

a display unit overlaid on the touch sensor and configured to display a map representing a route; and a memory unit configured to store map data including elevation information for each route location on the route on the map, wherein the control unit controls the tactile sensation providing unit, when the touch sensor detects the slide operation by the contacting object, to vary the tactile sensation provided to the contacting object during the slide operation in accordance with the elevation information for the location along the route on the map corresponding to the position of the contacting object during the slide operation.

2. The tactile sensation providing device according to claim 1, wherein the control unit searches for a route from a point of departure to a destination and controls the display unit to display the route on the map being displayed, and when the touch sensor detects an operation to search again by the contacting object in a predetermined region including a position on the route, the control unit searches again for another route including a region with a smaller elevation difference than an elevation difference in the predetermined region.

* * * * *